US006659656B2

(12) United States Patent
Brezina et al.

(10) Patent No.: US 6,659,656 B2
(45) Date of Patent: Dec. 9, 2003

(54) PACKAGING ARCHITECTURE FOR A MULTIPLE ARRAY TRANSCEIVER USING A WINGED FLEXIBLE CABLE FOR OPTIMAL WIRING

(75) Inventors: Johnny R. Brezina, Austin, TX (US); Brian M. Kerrigan, Austin, TX (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/006,839

(22) Filed: Nov. 5, 2001

(65) Prior Publication Data

US 2003/0103737 A1 Jun. 5, 2003

(51) Int. Cl.[7] .................................................. G02B 6/36
(52) U.S. Cl. .............................. 385/92; 385/88; 385/89; 257/81; 257/433
(58) Field of Search .............................. 385/88–94, 49; 257/431–433, 80–82

(56) References Cited

U.S. PATENT DOCUMENTS 6,264,481 B1 * 7/2001 Kozel et al. .................. 439/92

OTHER PUBLICATIONS

U.S. Patent Application entitled "Packaging Architecture for a Multiple Array Transceiver Using a Continuous Flexible Circuit", (Inventors Johnny R. Brezina, et al.).
U.S. Patent Application entitled "Flexible Cable Stiffener for an Optical Transceiver", (Inventors Johnny R. Brezina, et al.).
U.S. Patent Application entitled "Enhanced Folded Flexible Cable Packaging for use in Optical Transceivers", (Inventors Johnny R. Brezina, et al.).
U.S. Patent Application entitled "Packaging Architecture for a Multiple Array Transceiver Using a Flexible Cable", (Inventors Johnny R. Brezina, et al.).
U.S. Patent Application entitled "Packaging Architecture for a Multiple Array Transceiver Using a Flexible Cable Stiffener for Customer Attachment", (Inventors Johnny R. Brezina, et al.).
U.S. Patent Application entitled "Horizontal Carrier Assembly for Multiple Array Optoelectronic Devices", (Inventors Johnny R. Brezina, et al.).

* cited by examiner

*Primary Examiner*—Hemang Sanghavi
*Assistant Examiner*—Scott Knauss
(74) *Attorney, Agent, or Firm*—Cardinal Law Group; Casimer K. Salys

(57) ABSTRACT

The packaging architecture for a multiple array transceiver using a winged flexible cable for optimal wiring of the present invention provides a 90-degree transition between an optical signal input/output at a communication chassis bulkhead, and provides an attachment to a heat spreader for use in wiring electrical components to the flexible cable. The packaging architecture system comprises a forward vertical carrier having an optical converter, a rearward horizontal I/O block oriented about 90 degrees from the forward vertical carrier, a heat spreader, and a flexible cable attached to the sides of the heat spreader. The multiple array transceiver makes the 90-degree transition within a narrow gap established by industry and manufacturing standards. The multiple array transceiver also provides cooling to the internal electronics through a heat sink that is attached to the heat spreader which concurrently mounts and locates the transceiver to a common host board.

23 Claims, 6 Drawing Sheets

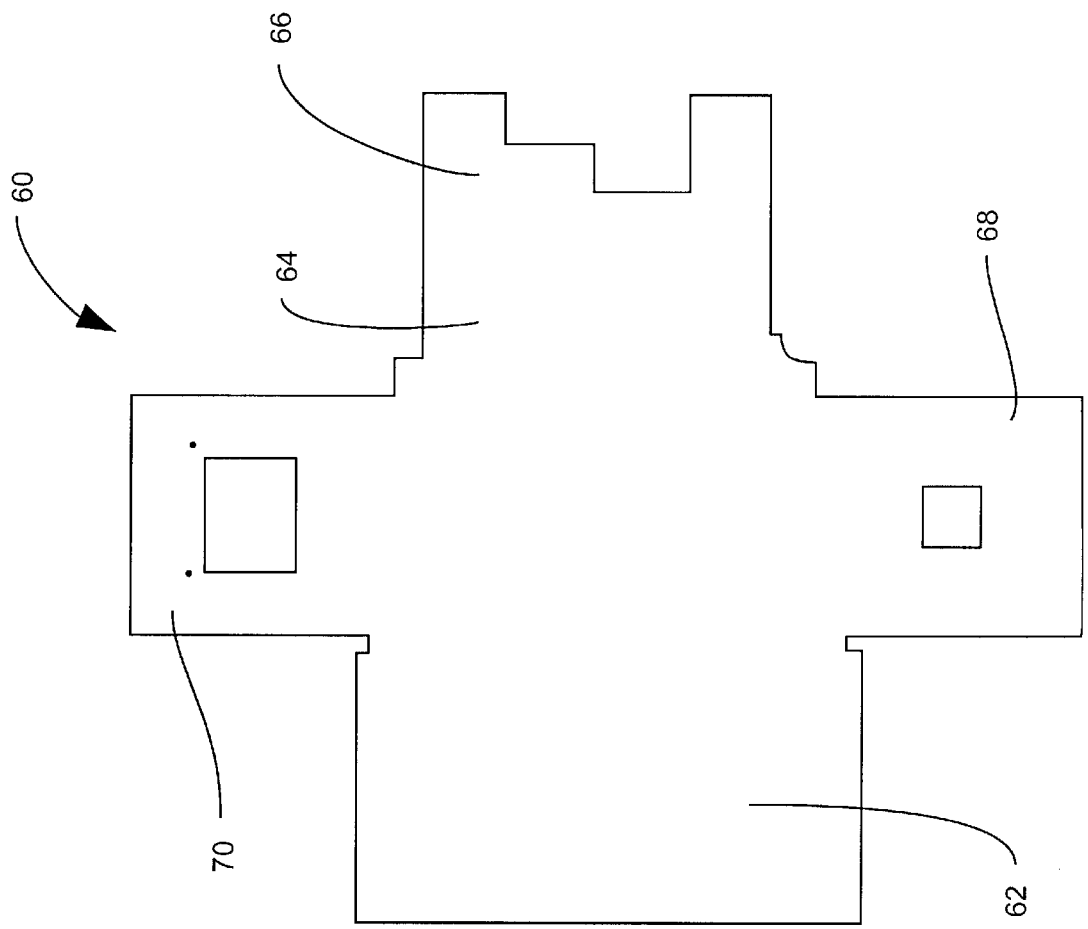

PACKAGING ARCHITECTURE FOR A MULTIPLE ARRAY TRANSCEIVER USING A WINGED FLEXIBLE CABLE FOR OPTIMAL WIRING

RELATED APPLICATIONS

This application claims priority to (U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment In A Fiber Optic Transceiver", by Johnny R. Brezina, et al. (U.S. patent application Ser. No. 10/007,027)

"External EMI Shield For Multiple Array Optoelectronic Devices" by Johnny R. Brezina, et al. (U.S. patent application Ser. No. 10/006,644)

"Packaging Architecture For A Multiple Array Transceiver Using A Continuous Flexible Circuit", by Johnny R. Brezina, et al. (U.S. patent application Ser. No. 10/007,026)

"Flexible Cable Stiffener for An Optical, Transceiver", by Johnny R. Brezina, et al. (U.S. patent application Ser. No. 10/007,028)

"Enhanced Folded Flexible Cable Packaging for Use in Optical Transceivers, by Johnny R. Brezina, et al. (U.S. patent application Ser. No. 10/006,836)

"Laser Output Monitoring In A Multiple Arrays Optical Sensor", by Johnny R. Brezina, et al. (U.S. patent application Ser. No. 10/007,024)

"Internal EMI Suppression Shield for Multiple Array Optoelectronic Devices", by Johnny R. Brezina, et al. (U.S. patent application Ser. No. 10/006,834)

"Multiple Array Optoelectronic Connector with Integrated Latch", by Johnny R. Brezina, et al. (U.S. patent application Ser. No. 10/007,023)

"Mounting a Lens Array in a Fiber Optic Transceiver", by Johnny R. Brezina, et al. (U.S. patent application Ser. No. 10/006,837)

"Packaging Architecture for a Multiple Array Transceiver Using a Flexible Cable", by Johnny R. Brezina, et al. (U.S. patent application Ser. No. 10/006,835)

"Packaging Architecture for a Multiple Array Transceiver Using a Flexible Cable and Stiffener for Customer Attachment", by Johnny R. Brezina, et al. (U.S. patent application Ser. No. 10/006,838)

"Horizontal Carrier Assembly for Multiple Array Optoelectronic Devices", by Johnny R. Brezina, et al. (U.S. patent application Ser. No. 10/007,215).

TECHNICAL FIELD

The technical field of this disclosure is computer systems, particularly, a packaging architecture for a multiple array transceiver using a winged flexible cable for optimal wiring.

BACKGROUND OF THE INVENTION

Optical signals entering a communications chassis can be converted to electrical signals for use within the communications chassis by a multiple array transceiver. The configuration of optical signal connections entering the communications chassis and the customer's circuit boards within the chassis require a 90-degree direction change in signal path from the optical to the electrical signal. This 90-degree configuration is required due to the right angle orientation between the customer's board and the rear bulkhead of the chassis. Existing multiple array transceiver designs use a number of small parts, such as tiny flexible interconnects with associated circuit cards and plastic stiffeners, to make the 90-degree transition. The size and number of the parts increases manufacturing complexity and expense.

In addition, existing multiple array transceivers are limited in the number of electrical signal paths they can provide between the optical input and the customer's board. It is desirable to provide as many electrical signal paths as possible, because optical fiber can typically provide a greater information flow rate than electrical wire. Industry and company standards further limit the space available for signal paths from the optical input to the customer's board, limiting the space to a narrow gap.

Thermal considerations may also limit the signal carrying capacity of current multiple array transceivers. Heat is generated by electrical resistance as the signals pass through the conductors and as the signals are processed by solid-state chips within the transceivers. Limitations on heat dissipation can limit the data processing speed and reduce transceiver reliability.

It would be desirable to have a packaging architecture for a multiple array transceiver using a folded flexible cable that would overcome the above disadvantages.

SUMMARY OF THE INVENTION

The packaging architecture for a multiple array transceiver using a winged flexible cable for optimal wiring of the present invention provides a 90-degree transition between an optical signal input/output at a communication chassis bulkhead, and provides an attachment to a heat spreader for use in wiring electrical components to the flexible cable. The packaging architecture system for a transceiver comprises a forward vertical carrier having an optical converter; a rearward horizontal I/O block, the rearward horizontal I/O block oriented about 90 degrees from the forward vertical carrier; a heat spreader, the heat spreader having a first side and a second side; and a flexible cable, the flexible cable having an electrical portion and at least two tabs oriented so that the electrical portion attaches to the first side of the heat spreader and the tabs attach to the second side of the heat spreader; wherein the flexible cable is operably connected between the forward vertical carrier and the rearward horizontal I/O block. The multiple array transceiver makes the 90-degree transition within a narrow gap established by industry and manufacturing standards. The multiple array transceiver also provides cooling to the internal electronics through a heat sink that is attached to the heat spreader which concurrently mounts and locates the transceiver to a common host board.

One aspect of the present invention provides a packaging architecture for a multiple array transceiver providing a 90-degree transition between the customer's board and the rear bulkhead of the chassis.

Another aspect of the present invention provides a packaging architecture for a multiple array transceiver with a reduced number of components for manufacturing ease and reduced cost.

Another aspect of the present invention provides a packaging architecture for a multiple array transceiver providing an interconnection containing a very large number of signal paths in a narrow horizontal gap.

Another aspect of the present invention provides a packaging architecture for a multiple array transceiver providing a thermally efficient design with heat flow to the heat sink split into two distinct parallel paths.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 2 shows a schematic diagram of a flexible cable made in accordance with the present invention;

DETAILED DESCRIPTION OF THE PRESENTLY PREFERRED EMBODIMENTS

The packaging architecture for a multiple array transceiver using a winged flexible cable for optimal wiring of the present invention provides a 90-degree transition between an optical signal input at a communications chassis bulkhead and an interior board within the communications chassis. The multiple array transceiver makes the 90-degree transition within a narrow gap established by industry and manufacturer standards. The multiple array transceiver further provides cooling parallel cooling paths through a heat sink.

The present invention is shown and described by the following description and figures, and is generally described in the order in which the individual components are assembled during manufacture.

Figure 1:
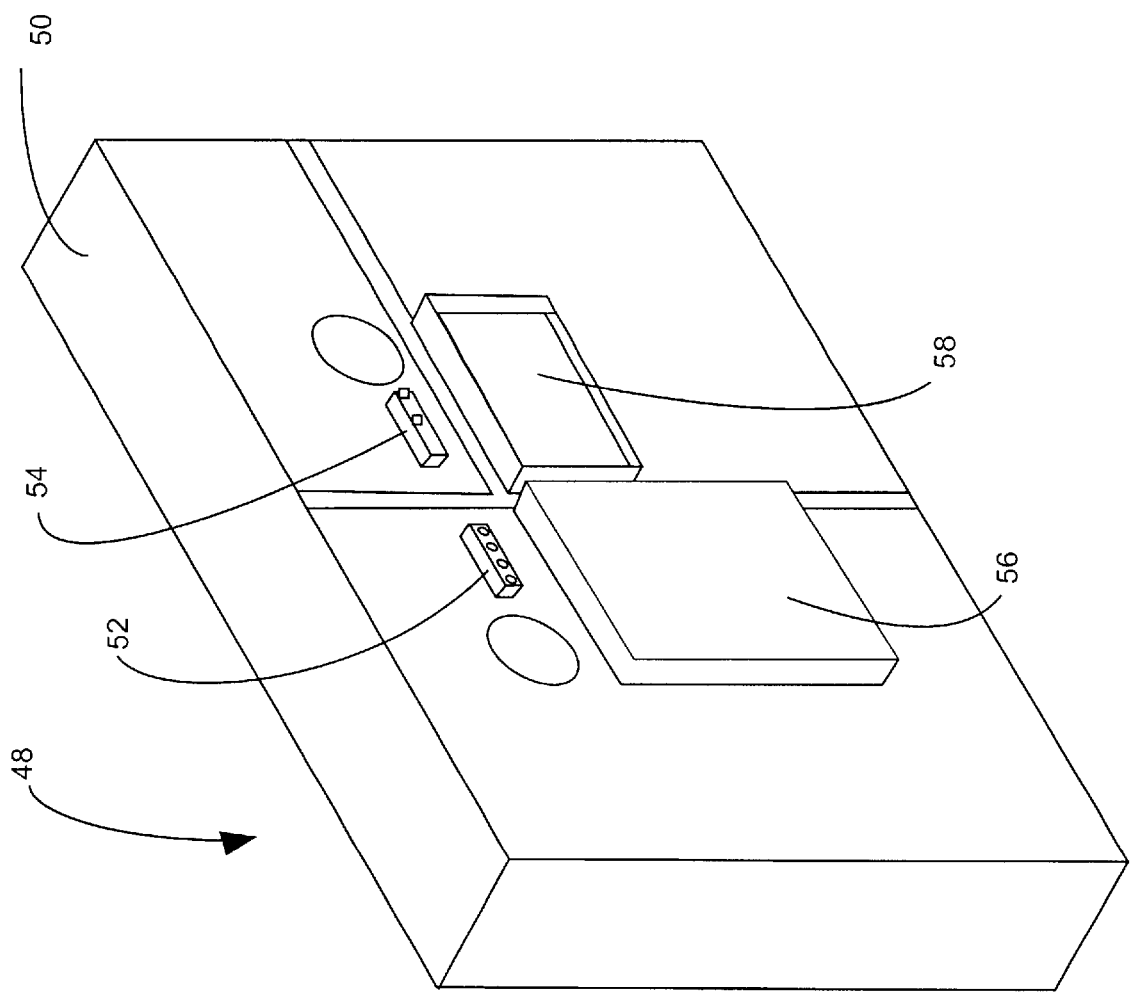
FIG. 1 shows an isometric diagram of a forward vertical carrier made in accordance with the present invention.

FIG. 1 shows an isometric diagram of a forward vertical carrier made in accordance with the present invention. The forward vertical carrier 48 comprises common substrate carrier 50, laser die 52, photodetector die 54, laser drive amplifier (LDA) 56, and transimpedance amplifier (TIA) 58. Laser die 52 and photodetector die 54 are attached to a common substrate carrier 50 by using standard die bond epoxy material and technique as will be appreciated by those skilled in the art. The LDA 56 and TIA 58 are also die bonded to the substrate carrier 50 in close proximity to the laser die 52 and photodetector die 54 to provide short critical transmission interconnection wire bond lengths. The TIA 58 acts as the photodetector interface chip. The laser die 52 and photodetector die 54 are precisely aligned to provide optimum communication with a fiber optic cable which can be attached to the laser die 52 and photodetector die 54.

The laser die 52 and photodetector die 54 with their associated circuits perform as optical converters to convert a light signal coming into the transceiver to an electrical signal or convert an electrical signal from the transceiver to a light signal. In one embodiment, the optical converters can be lasers only, so that the transceiver only transmits optical signals. In another embodiment, the optical converters can be photodetectors only, so that the transceiver only receives optical signals. In other embodiments, the number of lasers and photodetectors can be predetermined to meet the number of transmit and receive channels desired.

FIG. 2 shows a schematic diagram of a flexible cable made in accordance with the present invention. The flexible cable 60 is shown in an unfolded configuration. A flexible cable 60 comprises an electrical portion 62, a transfer portion 64, and an optical portion 66, a first electrical tab 68, and a second electrical tab 70. In other embodiments, additional electrical tabs can be provided as desired for a particular application.

Figure 3A:
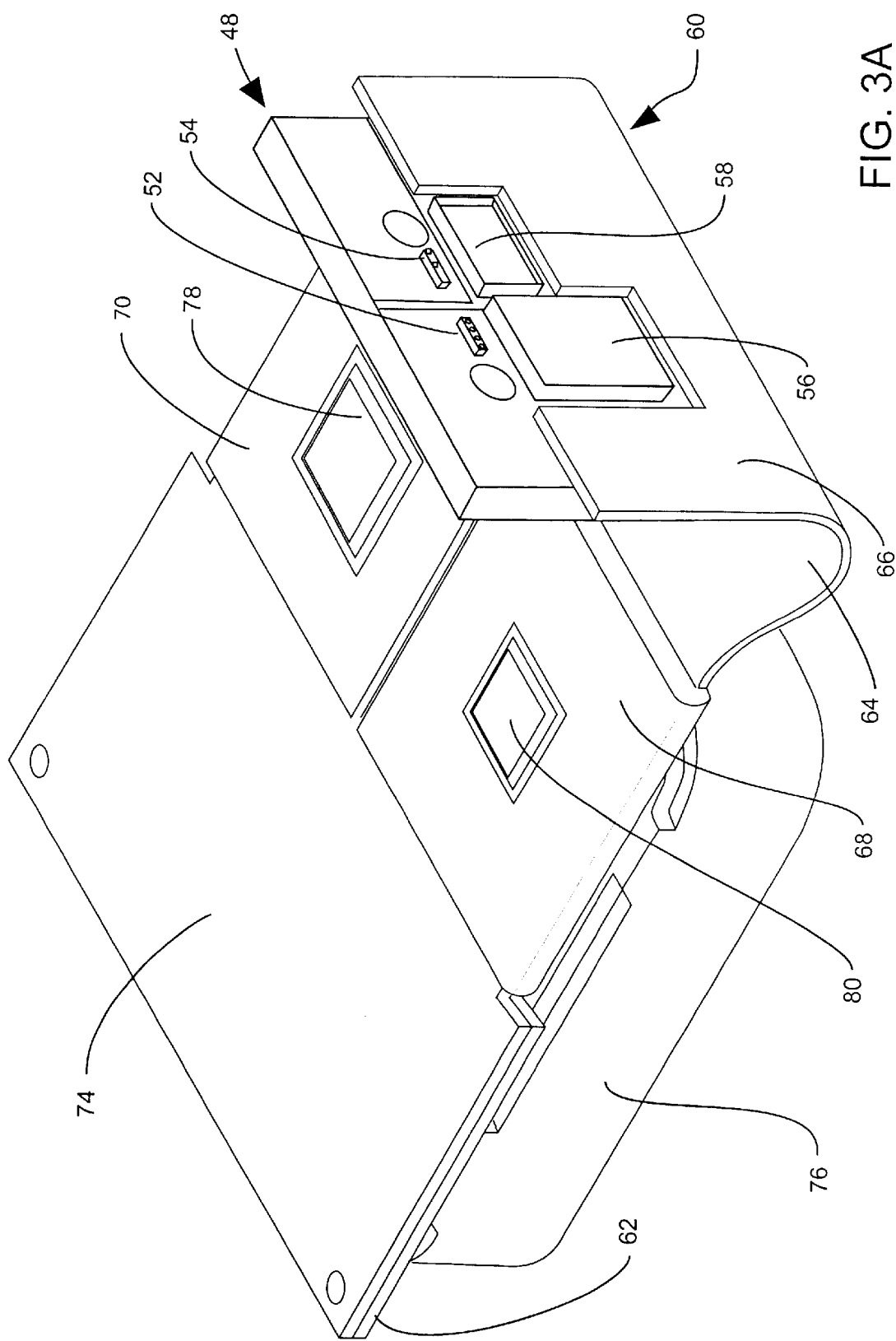
FIGS. 3A & 3B show isometric diagrams of a forward vertical carrier in place in an I/O assembly made in accordance with the present invention.
Figure 3B:
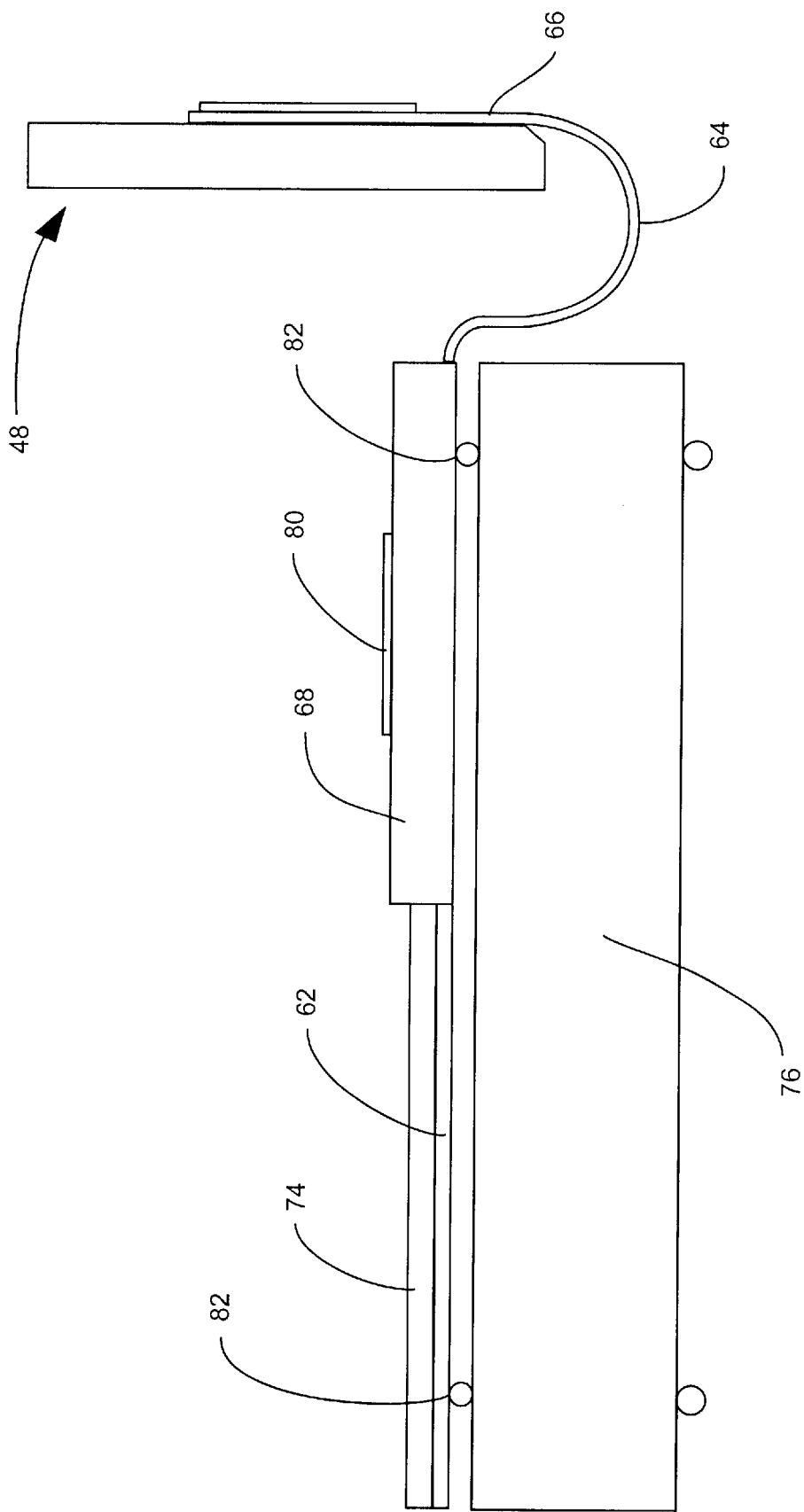

FIGS. 3A & 3B, in which like elements have like reference numbers, show isometric diagrams of a forward vertical carrier in place in an I/O assembly made in accordance with the present invention. A flexible cable is folded around a heat spreader to increase cooling capability.

The flexible cable 60 electrically connects rearward horizontal I/O block 76 to the forward vertical carrier 48, where the laser die 52 and photodetector die 54 are located. The flexible cable 60 can contain a plurality of conductors carrying a plurality of signals. The flexible cable 60 can be narrow to allow passage through a narrow gap, such as occurs between mounting screw locations. This allows the J-shaped interconnection between the rearward horizontal I/O block 76 and forward vertical carrier 48 to contain a very large number of signals in a narrow horizontal gap. The transfer portion 64 provides the 90-degree transition between the generally vertical forward vertical carrier 48 and the generally horizontal I/O block 76.

The flexible cable 60 can be attached to the heat spreader 74 and the forward vertical carrier 48. The optical portion 66 can be adhesively bonded to the face of the forward vertical carrier 48 where the electronic components are mounted. The optical portion 66 can be terminated in a profile around the LDA 56 and TIA 58 to match the shape of the LDA 56 and TIA 58 to provide ease of connection. The optical portion 66 can have wire bond pads in the area around the LDA 56 and TIA 58 to allow wire bonding to the dies.

The flexible cable 60 has a folded shape, which provides the electrical portion 62 below a heat spreader 74, and the first electrical tab 68 and second electrical tab 70 above the heat spreader 74. The flexible cable 60 can be adhesively bonded to the heat spreader 74. The first electrical tab 68 and second electrical tab 70 are folded at 180 degrees to the plane of the electrical portion 62 and perpendicular to the long axis of the multiple array transceiver. The first electrical tab 68 and second electrical tab 70 can have square clearance holes through them to allow the receiver post amplifier 78 and eeprom 80 die to be die attached in conventional means to the heat spreader 74 and wire bond interconnected. The electrical portion 62 can substantially cover the underside of the heat spreader 74, if desired. The face of the electrical portion 62 away from the heat spreader 74 is soldered to the I/O block 76. Interconnection circuit traces connecting the receiver post amplifier 78, eeprom 80, and the I/O block 76 can be routed between the solder ball array 82, with top side wire bond pads creating additional paths between the first electrical tab 68 and second electrical tab 70, if desired. The receiver post amplifier 78 and eeprom 80 dissipate heat into the heat spreader 74, which in turn is connected to a heat sink.

Figure 4A:
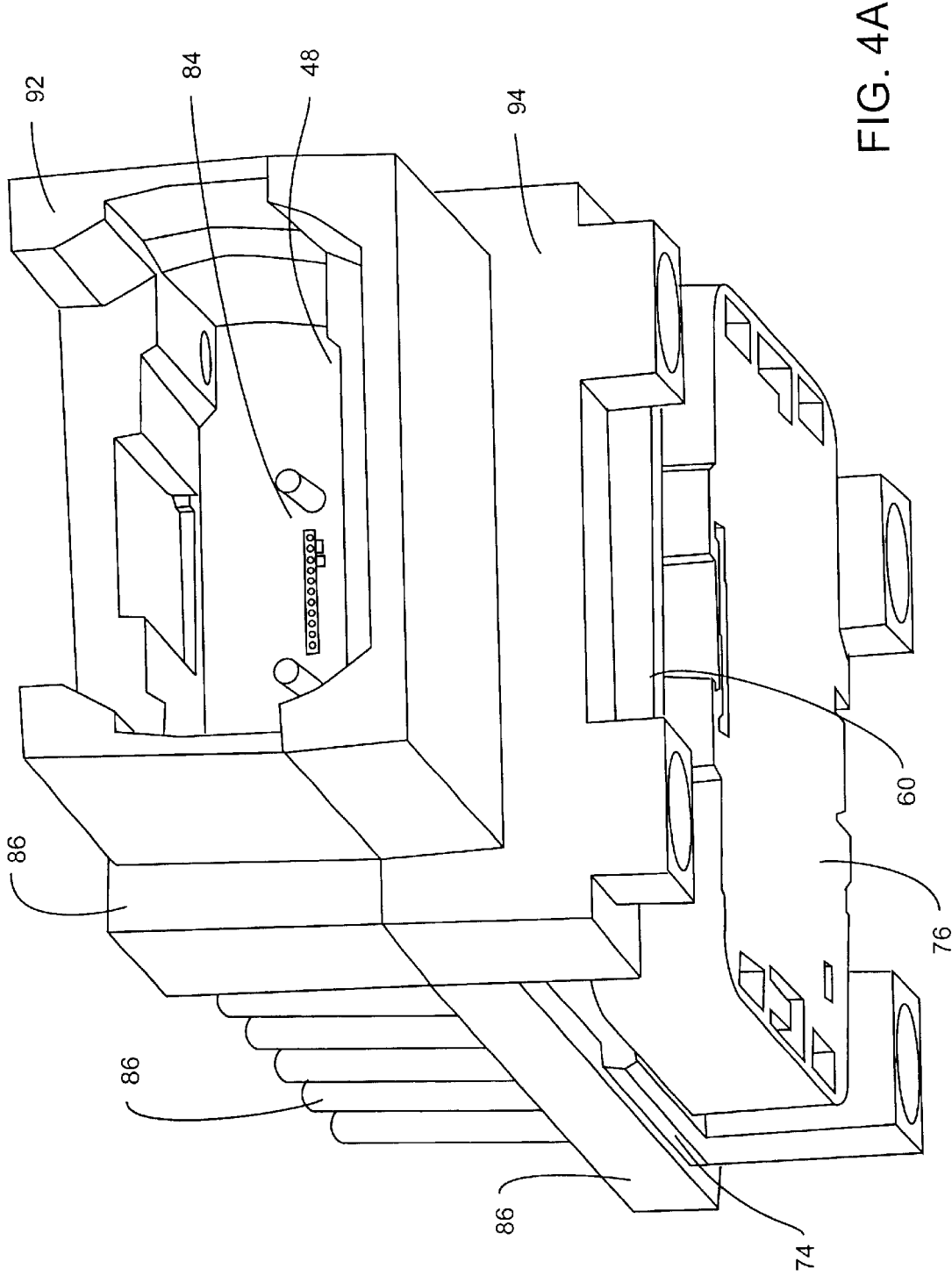
FIGS. 4A & 4B show isometric diagrams of a packaging architecture for a multiple array transceiver using a folded flexible cable made in accordance with the present invention.
Figure 4B:
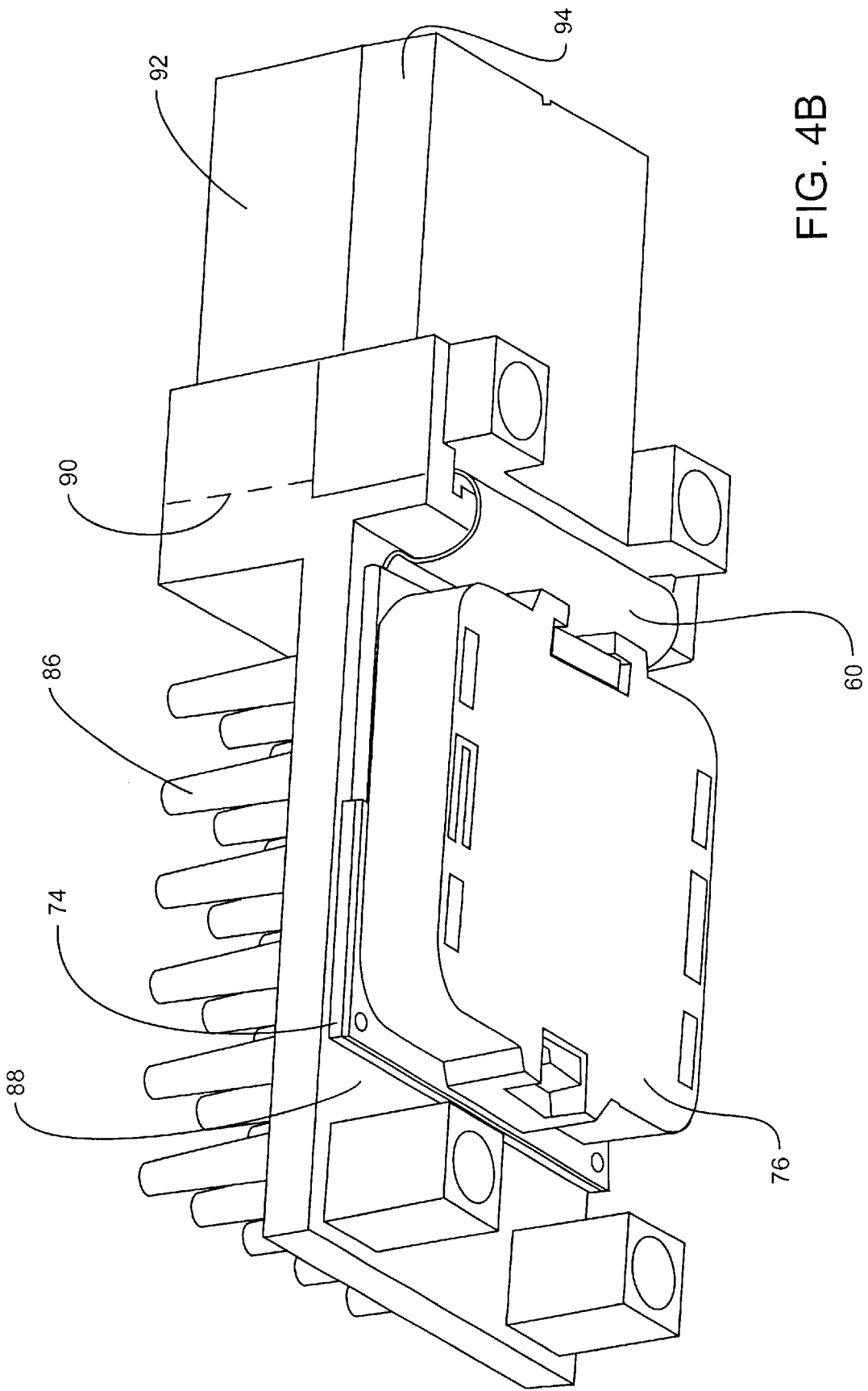

FIGS. 4A & 4B, in which like elements have like reference numbers, show isometric diagrams of a packaging architecture for a multiple array transceiver using a folded flexible cable made in accordance with the present invention.

Referring to FIG. 4A, the optical lens assembly 84 is aligned and UV epoxy bonded to the forward vertical carrier 48. Precise alignment provides efficient optical signal transfer. The heat sink 86 provides the 90-degree angle between the forward vertical carrier 48 and the I/O block 76, as well as heat transfer from those elements. The heat spreader 74 and forward vertical carrier 48 can be thermally connected to the heat sink 86 with adhesive, epoxy, or the like, as will be appreciated by those skilled in the art. The heat sink 86 can be made of any material with high thermal conductivity, such as aluminum or copper, and can be formed by various processes, such as die casting or machining.

Referring to FIG. 4B, the heat sink 86 incorporates a heat sink vertical portion 90 and a heat sink horizontal portion 88. The connection of the forward vertical carrier 48 and the heat spreader 74 to the heat sink vertical portion 90 and a heat sink horizontal portion 88, respectively, provides the 90-degree angle between the forward vertical carrier 48 and the I/O block 76. The flexible cable 60 bends to provide the electrical connection between the vertical and horizontal portions. This 90-degree configuration is required due to the right angle orientation between the customer's interior circuit board and the rear bulkhead of the chassis.

The connection of the heat sink 86 to the heat spreader 74 provides heat transfer beyond the heat transfer from the forward vertical carrier to the heat sink 86 alone. This creates a thermally efficient design, since heat flow through the heat sink 86 is split into two distinct parallel paths: one path from the forward vertical carrier to the heat sink 86 near the forward vertical carrier and a second path from the heat spreader 74 to the portion of the heat sink 86 away from the forward vertical carrier. The receiver post amplifier and eeprom dissipate heat into the heat spreader. The heat sink 86 can have fins, pins, vanes, passive cooling, or active cooling on the open surface to assist in heat transfer.

The heat sink 86 further comprises an upper retainer shell 92 to house a fiberoptic connector (not shown). After the forward vertical carrier 48 has been assembled onto the heat sink 86, a lower retainer shell 94 is attached to the upper retainer shell 92. In one embodiment, the upper retainer shell 92 and lower retainer shell 94 can be connected with an interleaved mating feature, such as a dovetail joint or other slideable joint. An EMI assembly clip (not shown) can be slid over the upper retainer shell 92 and the lower retainer shell 94. The EMI assembly clip can provide both EMI and ground connection points to the customer chassis bulkhead.

This completes the assembly of the multiple array transceiver module. The module can be attached to the customer's board by connecting the I/O block 76 to the mating connector on the customer's board, and securing four screws from the back side of the customer's board into mounting screw locations on the heat sink 86 and the lower retainer shell 94.

It is important to note that the figures and description illustrate specific applications and embodiments of the present invention, and is not intended to limit the scope of the present disclosure or claims to that which is presented therein. While the figures and description present a 2.5 gigahertz, 4 channel transmit and 4 channel receive multiple array transceiver, the present invention is not limited to that format, and is therefore applicable to other array formats including dedicated transceiver modules, dedicated receiver modules, and modules with different numbers of channels. For example, other embodiments can include multiple in-line lasers and receivers or arrays of lasers and receivers, e.g., 8×8 or 16×16 grids. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A packaging architecture system for a transceiver comprising:
   a forward vertical carrier having an optical converter;
   a rearward horizontal I/O block, the rearward horizontal I/O block oriented about 90 degrees from the forward vertical carrier;
   a heat spreader, the heat spreader having a first side and a second side; and
   a flexible cable, flexible cable having an electrical portion and at least two tabs, the electrical portion attached to the first side of the heat spreader and the tabs attached to the second side of the heat spreader;
   wherein the flexible cable is operably connected between the forward vertical carrier and the rearward horizontal I/O block.

2. The system of claim 1 wherein the optical converter is at least one laser.

3. The system of claim 1 wherein the optical converter is at least one photodetector.

4. The system of claim 1 further comprising an electronic component die thermally connected to the forward vertical carrier.

5. The system of claim 1 further comprising an electronic component die thermally connected to the heat spreader.

6. The system of claim 1 further comprising a heat sink thermally connected to the forward vertical carrier.

7. The system of claim 1 further comprising a heat sink thermally connected to the heat spreader.

8. The system of claim 1 further comprising a heat sink having a heat sink vertical portion and a heat sink horizontal portion, the heat sink vertical portion being attached to the forward vertical carrier and the heat sink horizontal portion being attached to the heat spreader.

9. A packaging architecture system for a transceiver comprising:
   first means for supporting an optical converter;
   second means for supporting an I/O block, the second supporting means oriented about 90 degrees from the first supporting means; the second supporting means having a first side and a second side; and
   means for electrically connecting the optical converter and the I/O block, the electrical connecting means having an electrical portion and at least two tabs, the electrical portion attached to the first side of the second supporting means and the tabs attached to the second side of the second supporting means.

10. The system of claim 9 wherein the optical converter is at least one laser.

11. The system of claim 9 wherein the optical converter is at least one photodetector.

12. The system of claim 9 further comprising an electronic component die thermally connected to the first supporting means.

13. The system of claim 9 further comprising an electronic component die thermally connected to the second supporting means.

14. The system of claim 9 further comprising means for removing heat thermally connected to the first supporting means.

15. The system of claim 9 further comprising means for removing heat thermally connected to the second supporting means.

16. The system of claim 9 further comprising means for removing heat, the heat removing means having a heat sink vertical portion and a heat sink horizontal portion, the heat sink vertical portion being attached to the second supporting means and the heat sink horizontal portion being attached to the second supporting means.

17. A packaging architecture system for a transceiver comprising:
   a heat sink, the heat sink having a first surface and a second surface, the first surface being oriented about 90 degrees from the second surface;
   a forward vertical carrier having an optical converter, the forward vertical carrier being attached to the first surface of the heat sink;
   a heat spreader, the heat spreader having a first side and a second side, the second side of the heat spreader being attached to the second surface of the heat sink;
   a rearward horizontal I/O block, the rearward horizontal I/O block being attached to the first side of the heat spreader; and
   a flexible cable operably connected between the forward vertical carrier and the heat spreader, the flexible cable having an electrical portion and at least two tabs, the electrical portion attached to the first side of the heat spreader and the tabs attached to the second side of the heat spreader.

18. The system of claim 17 wherein the optical converter comprises at least one laser.

19. The system of claim 17 wherein the optical converter is at least one photodetector.

20. The system of claim 17 further comprising an electronic component die thermally connected to the forward vertical carrier.

21. The system of claim 20 wherein the electronic component is selected from the group consisting of a laser drive amplifier and a transimpedance amplifier.

22. The system of claim 17 further comprising an electronic component die thermally connected to the heat spreader.

23. The system of claim 22 wherein the electronic component is selected from the group consisting of a receiver post amplifier and an eeprom.

* * * * *